(12) United States Patent
Egawa et al.

(10) Patent No.: US 8,285,235 B2
(45) Date of Patent: Oct. 9, 2012

(54) WIRELESS COMMUNICATION APPARATUS

(75) Inventors: Hiroyuki Egawa, Fukuoka (JP);
Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 12/817,781

(22) Filed: Jun. 17, 2010

(65) Prior Publication Data
US 2010/0323650 A1  Dec. 23, 2010

(30) Foreign Application Priority Data

Jun. 23, 2009 (JP) ................... 2009-148973

(51) Int. Cl.
*H04B 1/18* (2006.01)
(52) U.S. Cl. ............... 455/193.1; 455/277.2; 455/277.1; 455/134; 455/135
(58) Field of Classification Search ............... 455/193.1, 455/277.2, 277.1, 134, 135
See application file for complete search history.

(56) References Cited

U.S. PATENT DOCUMENTS

| 6,064,868 | A | * | 5/2000 | Kobayashi | ............... 455/193.1 |
| 7,546,104 | B2 | * | 6/2009 | Kitayama et al. | .......... 455/277.2 |
| 2006/0079196 | A1 | * | 4/2006 | Atsumi | .................... 455/313 |
| 2006/0183431 | A1 | | 8/2006 | Chang et al. | |

FOREIGN PATENT DOCUMENTS

| JP | 2002-118488 | 4/2002 |
| WO | 2006-089018 | 8/2006 |

* cited by examiner

*Primary Examiner* — Sanh Phu
(74) *Attorney, Agent, or Firm* — Katten Muchin Rosenman LLP

(57) ABSTRACT

A wireless communication apparatus includes: an antenna; a communication unit for receiving a radio signal via the antenna; a tuning unit for tuning an impedance of the antenna; an impedance controller for controlling the tuning unit to match the impedance of the antenna with an impedance of the communication unit; and a halting unit for halting controlling the impedance of the antenna in accordance with an intensity of the received radio signal.

5 Claims, 4 Drawing Sheets

WIRELESS COMMUNICATION APPARATUS

CROSS-REFERENCE TO RELATED APPLICATION

This application is based upon and claims the benefit of priority of the prior Japanese Patent Application No. 2009-148973 filed on Jun. 23, 2009, the entire contents of which are incorporated herein by reference.

FIELD

The embodiments discussed herein are related to a wireless communication apparatus.

BACKGROUND

Typical wireless communication apparatuses each include therein a tuning unit configured to match the impedance of an antenna thereof with that of a communication unit thereof. Further, a method, in which such a tuning unit includes a variable impedance device therein, and changing the impedance value of the variable impedance device in accordance with the variation of the impedance of the antenna enables matching the impedance of the antenna and that of the communication unit, is well known to those skilled in the art.

In addition, technologies, which allow a mobile wireless terminal device to include an antenna tuning unit configured to perform impedance matching for all frequencies of receiving and transmitting radio signals, an antenna matching circuit control unit configured to include a variable amount of capacitance therein and perform impedance matching control on the antenna impedance of an antenna, and a controller configured to compare the level of a reception electric field of signals inputted to the mobile wireless terminal device and the level of a reception electric field of signals received at a base station communicating with the mobile wireless terminal device, and on the basis of this comparison result, perform impedance matching control on the antenna impedance by changing the amount of capacitance included in the antenna matching circuit control unit so that the antenna impedance can be optimal for a frequency of either the reception electric field of signals inputted to the mobile wireless communication terminal or the reception electric field of signals received at the base station communicating with the mobile wireless terminal device, whichever is lower in level, are well known to those skilled in the art (refer to Japanese Laid-open Patent Publication No. 2002-118488).

Further, a system and a method, which arbitrarily increase antenna efficiency in a transmitting frequency or a receiving frequency on the basis of a fading condition, an environmental condition, a non-ideal antenna efficiency balance, a mobile station forward versus reverse link usage condition, and a system forward versus reverse link usage condition, are well known to those skilled in the art (refer to Japanese Laid-open Patent Publication No. 2008-530957).

Frequent operations of changing the impedance value of a variable impedance device included in a matching device are likely to advance degradation of the variable impedance device. Further, performing processes of controlling the impedance value of a variable impedance device included in a matching device leads to increasing of electric power consumption.

SUMMARY

According to an aspect of the embodiment, a wireless communication apparatus includes: an antenna; a communication unit for receiving a radio signal via the antenna; a tuning unit for tuning an impedance of the antenna; an impedance controller for controlling the tuning unit to match the impedance of the antenna with an impedance of the communication unit; and a halting unit for halting controlling the impedance of the antenna in accordance with an intensity of the received radio signal.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
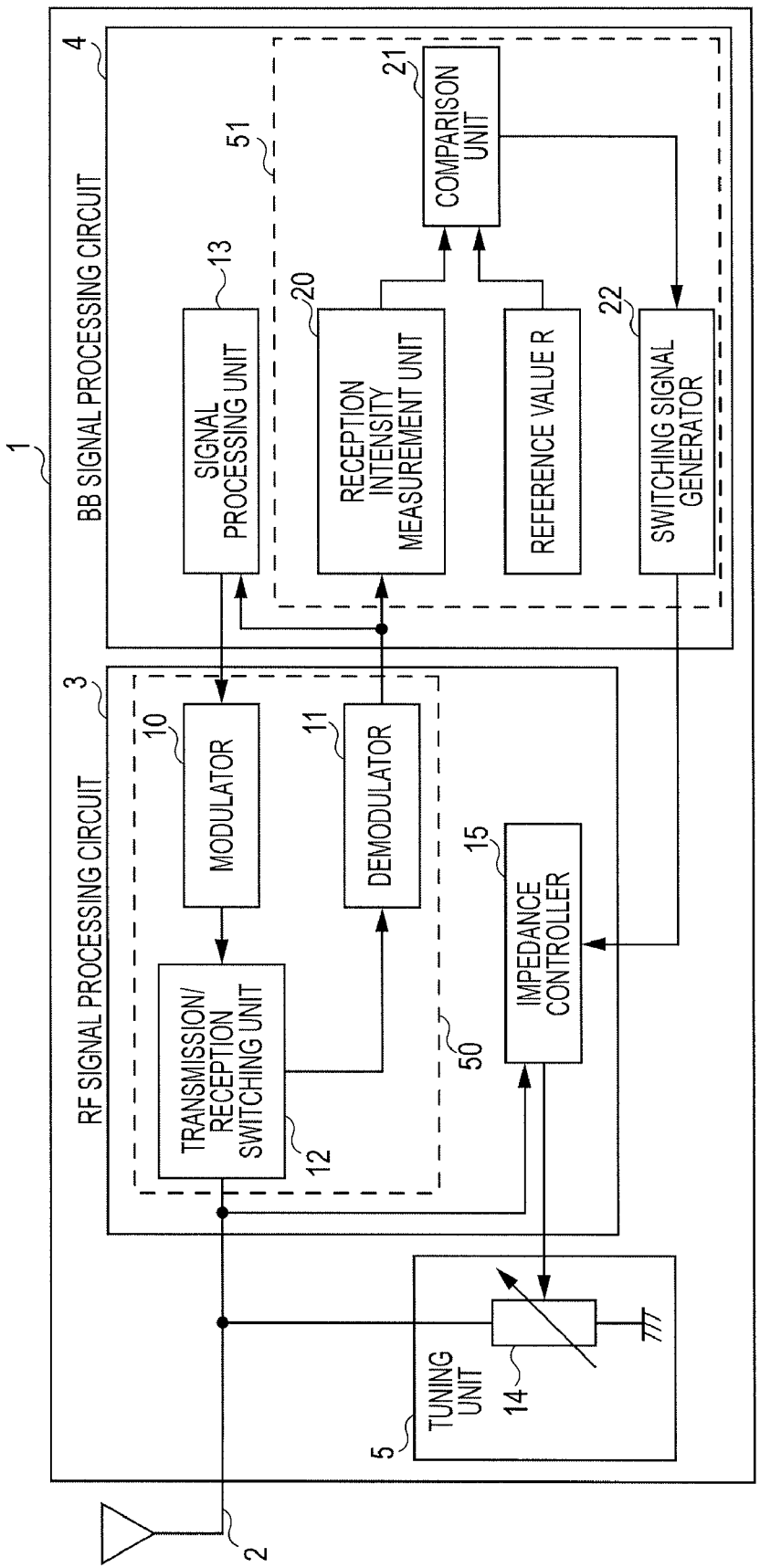
FIG. 1 is a diagram illustrating a configuration of a wireless communication apparatus.

Hereinafter, an embodiment according to the present invention will be described with reference to accompanying drawings. FIG. 1 is a diagram illustrating a configuration of a wireless communication apparatus as an embodiment according to the present invention. In FIG. 1, reference numerals 1, 2, 3 and 4 denote a wireless communication apparatus, an antenna, a radio frequency (RF) signal processing circuit, and a baseband (BB) signal processing circuit, respectively. Further, hereinafter, the radio frequency signal processing circuit 3 and the baseband signal processing circuit 4 will be abbreviated by "an RF signal processing circuit 3 and "a BB signal processing circuit 4", respectively.

In the following explanation of this embodiment, a mobile communication apparatus which wirelessly communicates with a base station will be described as an embodiment of the wireless communication apparatus 1. However, this embodiment is not limited to the mobile communication apparatus. This embodiment is further applicable to other wireless communication apparatuses each enabling matching the impedance of an antenna with that of a communication unit by changing the impedance of a tuning unit.

In FIG. 1, reference numerals 10, 11, 12, 13, 14 and 15 denote a modulator, a demodulator, a transmission/reception switching unit, a signal processing unit, a variable impedance device, and an impedance controller, respectively. A communication unit 50 includes the transmission/reception switching unit 12, the modulator 10, and the demodulator 11.

Further, reference numerals 20, 21 and 22 denote a reception intensity measurement unit, a comparison unit, and a switching signal generator, respectively. A halting unit 51 includes the reception intensity measurement unit 20, the comparison unit 21, and the switching signal generator 22.

The communication unit 50 receives the radio signal via the antenna 2. The tuning unit 5 tunes the impedance of the antenna 2. The impedance controller 15 controls the tuning unit 5 to match the impedance of the antenna 2 with the impedance of the communication unit 50. The halting unit 51 halts controlling the impedance of the antenna 2 in accordance with an intensity of the received radio signal.

The wireless communication apparatus 1 is configured to include the antenna 2, the RF signal processing circuit 3, the BB signal processing circuit 4 and the tuning unit 5. The RF signal processing circuit 3 is configured to modulate baseband signals, inputted from the BB signal processing circuit 4, into radio-frequency signals, and further, demodulate received signals, received from the antenna 2, into baseband signals.

The RF signal processing circuit 3 is configured to include the modulator 10, the demodulator 11, the transmission/reception switching unit 12 and the impedance controller 15. The modulator 10 is configured to modulate baseband signals, inputted from the BB signal processing circuit 4, into radio-frequency signals, and output the radio-frequency signals resulting from the modulation to the antenna 2 as transmitting signals. The demodulator 11 is configured to demodulate received signals, received from the antenna 2, into baseband signals, and output the baseband signals resulting from the demodulation to the BB signal processing circuit 4. The transmission/reception switching unit 12 is configured to perform switching of two connections, one being a connection from the modulator 10 to the antenna 2, the other one being a connection from the antenna 2 to the demodulator 11.

The impedance controller 15 is configured to, by adjusting the impedance value of the variable impedance device 14 included in the tuning unit 5, which will be described below, match the impedance of the antenna 2 with that of the RF signal processing circuit 3. The impedance controller 15 is configured to change the impedance value of the variable impedance device 14 by supplying a control signal thereto, which causes the impedance value of the variable impedance device 14 to be changed. Processes of controlling the impedance value of the variable impedance device 14, which are performed by the impedance controller 15, will be described below.

The BB signal processing circuit 4 is configured to perform processing on baseband signals which are to be modulated into radio-frequency signals by the RF signal processing circuit 3 and/or baseband signals which were demodulated from radio-frequency signals by the RF signal processing circuit 3. The BB signal processing circuit 4 is configured to include the signal processing unit 13, the reception intensity measurement unit 20, a comparison unit 21 and the switching signal generator 22.

The BB signal processing circuit 4 may be configured to realize a portion of or the whole of the components denoted by reference numerals 13 and 20 to 22 by using dedicated hardware circuits. The BB signal processing circuit 4 may be configured to include a processor, and a memory component for storing therein programs to be executed by the processor. Further, by causing the processor to execute the programs, a portion of or the whole of processes allocated to the components denoted by reference numerals 13 and 20 to 22 may be executed. The BB signal processing circuit 4 may be configured to include programmable large scale integrations (LSIs), such as field programmable gate arrays (FPGAs). The FPGAs may be configured to execute a portion of or the whole of processes allocated to the components denoted by reference numerals 13 and 20 to 22.

The signal processing unit 13 is configured to supply the modulator 10 included in the RF signal processing circuit 3 with baseband signals to be transmitted. The signal processing unit 13 is configured to receive baseband signals resulting from demodulation of received radio-frequency signals, the demodulation being performed by the demodulator 11, and perform processing on the received baseband signals in accordance with kinds and contents of signals to be handled by the wireless communication apparatus 1.

The reception intensity measurement unit 20 is configured to measure the reception intensity P of received signals on the basis of baseband signals resulting from demodulation of received signals having been received via the antenna 2. For example, the reception intensity measurement unit 20 may be configured to, as the reception intensity P, measure interference signal power included in the baseband signals outputted from the demodulator 11.

The comparison unit 21 is configured to compare the reception intensity P, having been measured by the reception intensity measurement unit 20, and a certain reference value R. The switching signal generator 22 is configured to generate switching signals on the basis of comparison results outputted from the comparison unit 21. The switching signal generator 22 is configured to, in the case where the reception intensity P is larger than the reference value R (i.e., P>R), generate a switching signal having a value "OFF". In contrast, the switching signal generator 22 is configured to, in the case where the reception intensity P is less than or equal to the reference value R (i.e., P≦R), generate a switching signal having a value "ON". The switching signal generator 22 is configured to output the switching signals to the impedance controllers 15.

The impedance controller 15 is configured to halt processes of adjusting the impedance value of the variable impedance device 14 during a period of time while being supplied with the switching signal having a value "OFF". The impedance controller 15 is configured to be allowed to perform adjustment of the impedance value of the variable impedance device 14 during a period of time while being supplied with the switching signal having values other than the value "OFF" (for example, during a period of time while being supplied with the switching signal having the value "ON"). The comparison unit 21 and the switching signal generator 22 are components corresponding to those of an example of a halting means according to an aspect of an embodiment of the present invention.

The tuning unit 5 is configured to match the impedance of the antenna 2 with that of the RF signal processing circuit 3. The tuning unit 5 is configured to include the variable impedance device 14 therein. The variable impedance device 14 is configured to change the amount of capacitance and/or inductance included therein in accordance with a control signal supplied from the impedance controller 15.

For example, the variable impedance device 14 may be configured to have a structure including a mechanical switch therein, such as a micro-electro-mechanical-systems (MEMS) based switch, and cause the mechanical switch to switch capacitors and coils connected to the antenna 2. Further, for example, the variable impedance device 14 may be a MEMS based variable capacitor component, which enables changing the amount of capacitance thereof in conjunction with the variation of a distance between electrodes formed on the tips of built-in components each having a micro-movable structure, the variation of a distance between the electrodes resulting from causing the positions of the electrodes to be mechanically varied in accordance with an electrical signal supplied thereto. Further, for example, the variable impedance device 14 may be a varactor diode.

Figure 2:
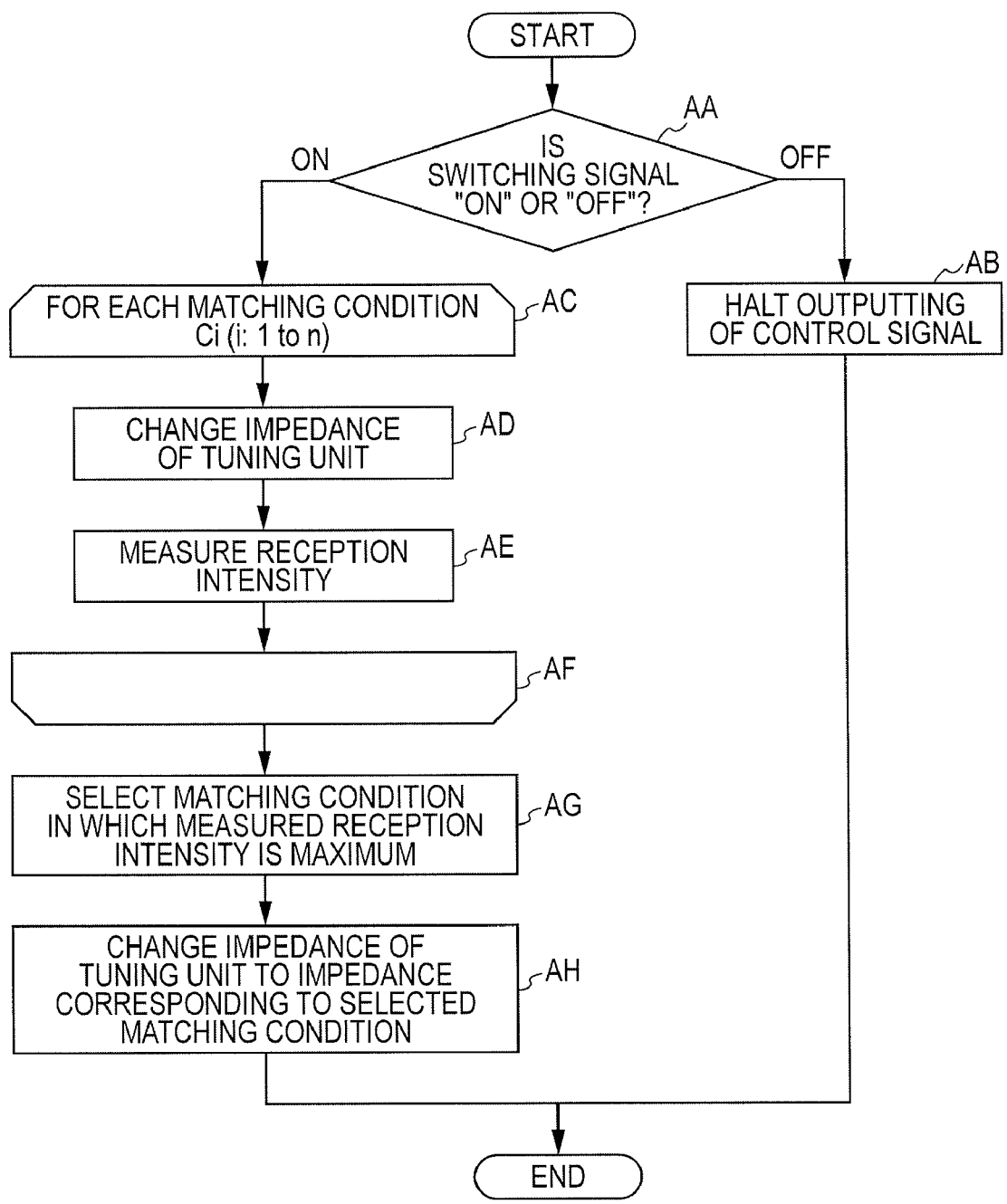
FIG. 2 is a diagram illustrating an example of adjustment processes performed by an impedance controller.

Next, processes of adjusting the impedance value of the variable impedance device 14, which are performed by the impedance controller 15, will be described below. FIG. 2 is a diagram illustrating an example of adjustment processes performed by the impedance controller 15. In addition, in another aspect of an embodiment of the present invention, each of operations AA to AH, which will be described below, may be a step.

In operation AA, the impedance controller 15 determines whether the value of the switching signal received from the switching signal generator 22 is "ON" or "OFF". In the case where it is determined that the value of the switching signal is "OFF" (operation AA: OFF), the impedance controller 15 moves the processing to operation AB. During a period of time while the value of the switching signal remains to be "OFF", the impedance controller 15 halts the processes of adjusting the impedance value of the variable impedance device 14 (operation AB).

While halting the processes of adjusting the impedance value of the variable impedance device 14, the impedance controller 15 may cause the control signal, which is supplied to the variable impedance device 14, to be in a halt condition. For example, in the case where the control signal is a voltage signal, the impedance controller 15 makes the level of the voltage signal, which is supplied to the variable impedance device 14, to be "0". Subsequent thereto, the impedance controller 15 terminates the processing.

In the case where it is determined in operation AA that the value of the switching signal is "ON" (operation AA: ON), the impedance controller 15 moves the processing to operation AC. The impedance controllers 15 performs operations AC to AF for each of predetermined matching conditions, the number of which is "n", each of the predetermined conditions being denoted by Ci ("i" is an integer number from 1 to "n").

In operation AD, the impedance controller 15 performs control by supplying a control signal to the variable impedance device 14 so that the impedance value of the variable impedance device 14 comes to a target value corresponding to each of the matching condition Ci. In operation AE, for each of the matching condition Ci, the impedance controller 15 measures received signal power regarding received signals having been received via the antenna 2.

In operation AG, the impedance controller 15 selects a matching condition, in which a maximum received signal power was measured, from among the matching conditions C1 to Cn. In operation AH, the impedance controller 15 performs control of the impedance value of the variable impedance device 14 so that the impedance value of the variable impedance device 14 comes to a target value corresponding to the matching condition having been selected in operation AG.

The above-described control processes enable the impedance controller 15 to, in accordance with variation of the impedance of the antenna 2, perform adjustment of the impedance value of the variable impedance device 14 so as to maximize the gain of the antenna 2. That is, the above-described control processes enable the impedance controller 15 to, in accordance with variation of the impedance of the antenna 2, match impedances between the antenna 2 and the RF signal processing circuit 3.

Figure 3:
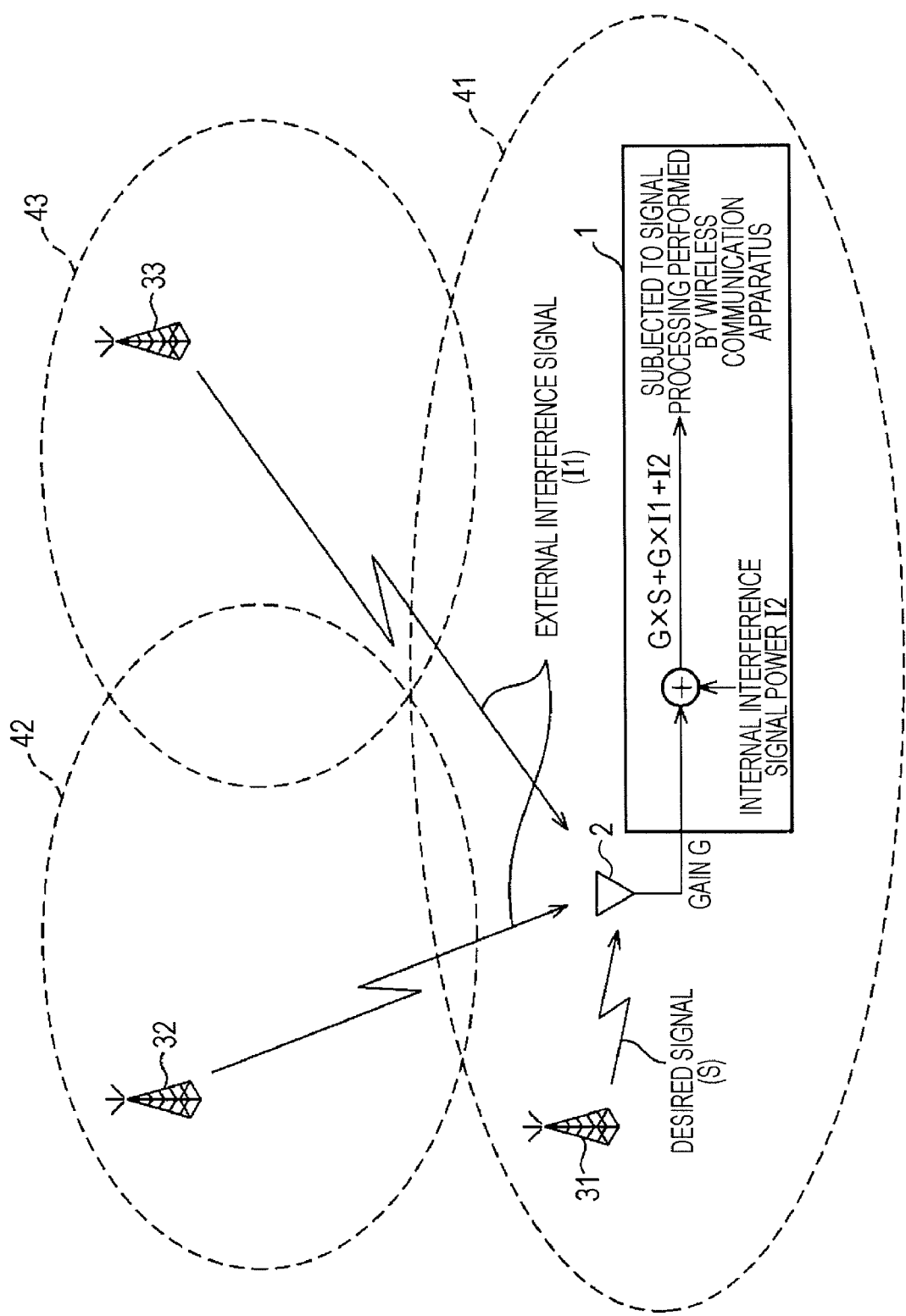
FIG. 3 is a diagram illustrating interference signal power added to electric power of received signals.

Next, interference signal power, which is added to the power of signals received by the wireless communication apparatus 1, will be described below. FIG. 3 is a diagram illustrating interference signal power added to the power of received signals. In FIG. 3, a reference numeral 31 denotes an opposing communication apparatus which is currently expected to wirelessly communicate with the wireless communication apparatus 1. Further, reference numerals 32 and 33 each are currently unexpected to communicate with the wireless communication apparatus 1. Reference numerals 41 to 43 are communication ranges within which wireless communication apparatuses are expected to wirelessly communicate with the corresponding communication apparatuses 31 to 33.

In the case where the wireless communication apparatus 1 is, for example, a mobile communication apparatus, the communication apparatuses 31 to 33 may be base stations. Further, the communication ranges 41 to 43 may be cell areas which are covered by the corresponding base stations 31 to 33. Since the wireless communication apparatus 1 is currently located within the cell area 41, the base station 31 is expected to communicate with the wireless communication apparatus 1.

Therefore, signals transmitting from the base station 31 and receiving at the wireless communication apparatus 1 are desired signals. Here, the signal power of desired signals, transmitting from the base station 31, receiving at the wireless communication apparatus 1 and inputting to the antenna 2, is denoted by "S". In the following description, a value resulting from multiplying the signal power S by a gain G of the antenna 2, i.e., G×S, will be sometimes called "desired signal power".

Meanwhile, signals, transmitting from the base stations 32 and 33 other than the base station 31 covering the cell 41, and receiving at the wireless communication apparatus 1, are external interference signals. Here, the total amount of the signal power of the external interference signals, transmitting from base stations other than the base station 31, receiving at the wireless communication apparatus 1 and inputting to the antenna 2, are denoted by "I1". In the following description, a value resulting from multiplying the signal power by the gain G of the antenna 2, i.e., G×I1, will be sometimes called "external interference signal power".

Further, internal interference signals occurring inside the wireless communication apparatus 1 are added to received signals having been received by the wireless communication apparatus 1. The internal interference signals include therein, for example, thermal noise signals, noise signals occurring in amplifiers and the like. The signal power of the internal interference signals is denoted by "internal interference signal power I2". Therefore, the total amount of signal power of received signals having been received by the wireless communication apparatus 1, i.e., $P_{all}$, is given by the following formula: $P_{all}=G \times S + G \times I1 + I2$. In the following description, the total amount of the signal power resulting from adding the internal interference signal power I2 to the external inference signal power (G×I1) will be sometimes called "interference signal power".

Meanwhile, transmission quality of a transmission link between the wireless communication apparatus 1 and the base station 31 can be verified by using a signal-to-interference ratio (SIR). This SIR can be calculated by using the following formula: $SIR=(G \times S)/(G \times S)/(G \times I1 + I2)$.

According to the above-described formula for calculating the SIR, in the case where the value of the external interference signal power (G×I1) is sufficiently large for the value of the internal interference signal power I2 to be ignored, it can be understood that the SIR is approximately equal to the vale of S/I1. That is, in the case where the value of the external interference signal power (G×I1) is larger than the reference value R, which is sufficiently larger than the value of the internal interference signal power I2, i.e., R>>I2, the SIR is approximately equal to the value of S/I1. As a result, in the case where the value of the external interference signal power (G×I1) is larger than the reference value R, the transmission quality is not affected by the gain G of the antenna 2. In such a case, it is unnecessary to perform processes of adjusting the impedance value of the variable impedance device 14 so as to match the impedance of the antenna 2 with that of the RF signal processing circuit 3.

The halting unit 51 halts controlling the impedance of the antenna 2 in accordance with the comparative result of the internal interference signal power and the external interference signal power. In this embodiment, by comparing the external interference signal power (G×I1) and the reference value R, it is possible to determine whether it is necessary to perform processes of adjusting the impedance value of the variable impedance device 14, or not. Further, in the case where a value sufficiently larger than the internal interference signal power I2 is selected as the reference value R, by comparing the interference signal power (G×I1+I2) and the reference value R, it is also possible to determine whether it is necessary to perform processes of adjusting the impedance value of the variable impedance device 14, or not.

For example, in the case where the wireless communication apparatus 1 is a mobile communication apparatus, except for the case where the wireless communication apparatus 1 is located under the environment where electric waves do not reach to a sufficient extent, such as underground shopping areas and suburbs far from base stations, there are lots of cases where a condition expressed by the following formula: Interference signal power (G×I1+I2)>Reference value R>>Internal interference signal power I2, is satisfied, and thus, the processes of adjusting the impedance value of the variable impedance device 14 is likely to be unnecessary.

Figure 4:
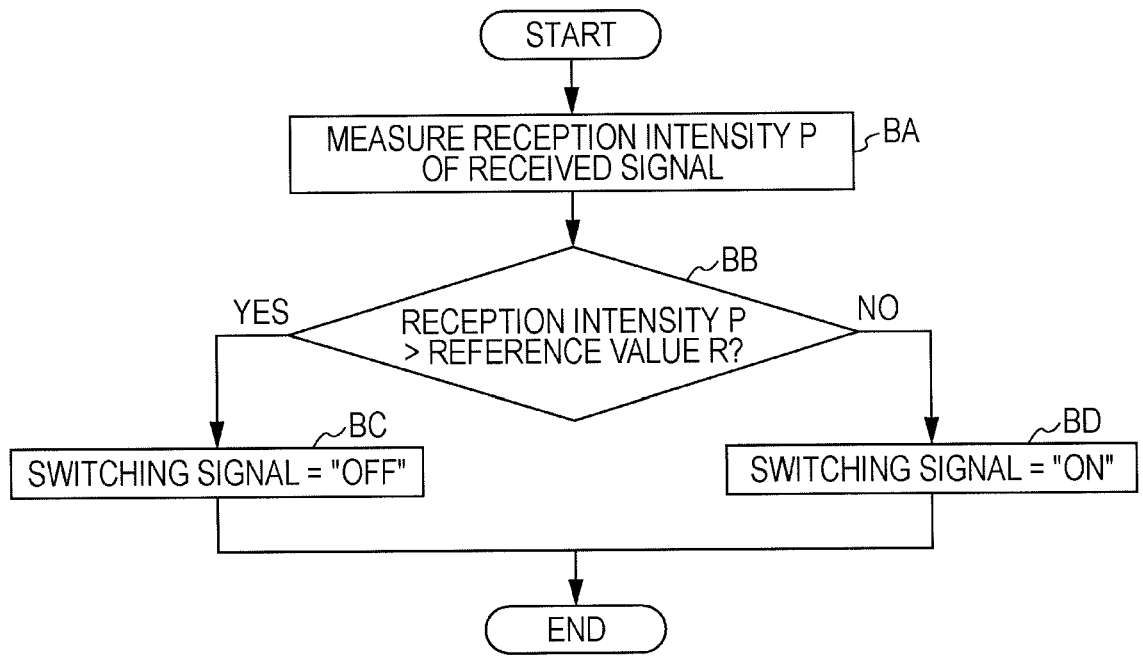
FIG. 4 is a diagram illustrating processes performed in an impedance control method.

Accordingly, in the case where the interference signal power (G×I1+I2) is larger than the reference value R, the switching signal generator 22 shown in FIG. 1 outputs a switching signal having a value "OFF", and thereby, causes the impedance controller 15 to halt the processes of adjusting the impedance value of the variable impedance device 14. FIG. 4 is a diagram illustrating processes performed in an impedance control method according to an embodiment of the present invention. In addition, in another aspect of an embodiment of the present invention, each of operations BA to BD, which will be described below, may be a step.

In operation BA, the reception intensity measurement unit 20 measures the reception intensity P of baseband signals resulting from demodulation of received signals and being inputted to the BB signal processing circuit 4. The reception intensity measurement unit 20 may measure, for example, the interference signal power (G×I1+I2) as the reception intensity P.

Figure 5:
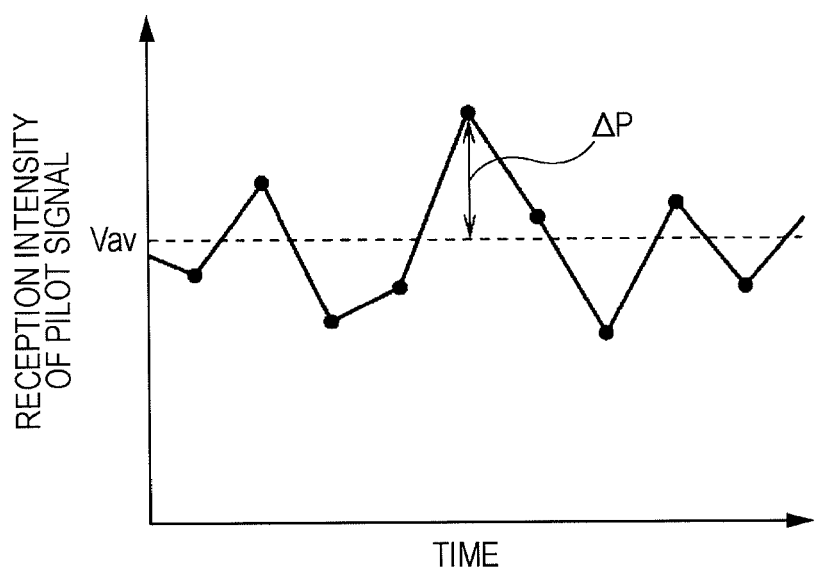
FIG. 5 is a diagram illustrating an example of an interference signal power measurement method.

FIG. 5 is a diagram illustrating an example of an interference signal power measurement method according to an embodiment of the present invention. The reception intensity measurement unit 20 measures a reception intensity of a baseband pilot signal at each of predetermined clock times, and calculates a mean value $V_{av}$ from reception intensities of the baseband pilot signal, resulting from measurements performed at a plurality of times. The reception intensity measurement unit 20 calculates a square mean error value between respective measurement values and the mean value $V_{av}$ as the interference signal power.

In operation BB shown in FIG. 4, the comparison unit 21 compares the reception intensity P, which is measured by the reception intensity measurement unit 20, and the reference value R. The reference value R may be determined in accordance with a noise figure NF and thermal noise X (=kBT) of the wireless communication apparatus 1. In addition, the symbol k represents the Boltzmann constant, and the symbols B and T represent a received-signal frequency bandwidth of the wireless communication apparatus 1 and an absolute temperature, respectively.

For example, the reference value R may be determined in advance by using the following formula (1) resulting from summation of a noise figure NF of the RF signal processing circuit 3, which is pre-planned in designing thereof, a thermal noise X in the case where the wireless communication apparatus is used at a rated temperature, and a predetermined margin M (for example, M=5 [dB])

$$\text{Reference value } R = NF + X + M \quad (1)$$

Further, a value resulting from calculation using the formula (1) in accordance with a current temperature may be used as the reference value R.

Alternatively, when the wireless communication apparatuses 1 are shipped, for each individual of the wireless communication apparatus 1 or each of extracted samples of the wireless communication apparatus 1, the internal interference signal power I2 of the wireless communication apparatus 1 is measured. Further thereto, the reference value R may be determined in advance by using the following formula (2) resulting from summation of this measured value I2 and a predetermined margin M (for example, M=5 [dB]).

$$\text{Reference value } R = I2 + M \quad (2)$$

The reference value R may be calculated by using this formula (2) and a value resulting from measurement of internal interference signal power included in output signals from the RF signal processing circuit 3, the value being regarded as the internal interference signal power I2 of the wireless communication apparatus.

In operation BB, in the case where it is determined that the reception intensity P is larger than the reference value R (operation BB: Y), that is, the following determination formula (3):

$$\text{Interference signal power } (G \times I1 + I2) > \text{reference value } R \quad (3)$$

is satisfied, the switching signal generator 22 outputs a switching signal having a value "OFF" to the impedance controller 15. In contrast, in operation BB, in the case where it is determined that the reception intensity P is less than or equal to the reference value R (operation BB: N), the switching signal generator 22 outputs a switching signal having a value "ON" to the impedance controller 15. Thus, the halting unit 51 restarts controlling the impedance of the antenna 2 in accordance with the reception intensity of the received radio signal after the halting unit 51 halts controlling the impedance of the antenna 2. Subsequent thereto, the processing is terminated.

According to the above-described embodiment, during a period of time while the SIR is not affected by the value of the gain G of the antenna 2, that is, during a period of time while the SIR is not affected by whether the impedances of the antenna 2 and the RF signal processing circuit 3 are sufficiently matched with each other, or not, the processes of adjusting the impedance value of the tuning unit 5 is halted. Therefore, the number of changing the impedance value of the tuning unit 5 is reduced. Furthermore, this reduction of the number of changing the impedance value of the tuning unit 5 results in delaying of the degradation of the variable impedance device 14.

Moreover, halting the processes of adjusting the impedance value, performed by the impedance controller 15 in operations AC to AH shown in FIG. 2, enables saving of electric power consumed in the processes of the adjustment. Further, halting the processes of adjusting the impedance value, performed by the impedance controller 15 in operations AC to AH shown in FIG. 2, enables saving of electric power consumed in the processes of the adjustment. Moreover, while halting the process of controlling the impedance value of the variable impedance device 14, causing the control signal, which is supplied to the variable impedance device 14 by the impedance controller 15, to be in a halt condition enables saving of electric power consumed in driving the variable impedance device 14.

In addition, in the above-described embodiment, the reception intensity measurement unit 20 measures the interference signal power (G×I1+I2) as the reception intensity P, and in the case where the measured interference signal power (G×I1+I2) is larger than the reference value R, the switching signal generator 22 outputs a switching signal having a value "OFF".

The signal-to-interference ratio SIR is given by a formula: $SIR=1/(I1/S+I2/(G\times S))$. Therefore, in the case where the value of the desired signal power (G×S) is sufficiently large for the internal interference signal power I2 to be ignored, the SIR is also approximately equal to S/I1 That is, in the case where the value of the desired signal power (G×S) is sufficiently large for the internal interference signal power I2 to be ignored, the SIR is not affected by the value of the gain G of the antenna 2.

Therefore, in a different embodiment, the reception intensity measurement unit 20 may be configured to measure the desired signal power (G×S) as the reception intensity P. Further, the switching signal generator 22 may be configured to output a switching signal having a value "OFF" in the case where the desired signal power (G×S) is larger than the reference value R. The received signal power intensity measurement unit 20 may calculate, for example, the mean value of the reception intensities $V_{av}$, which was described with reference to FIG. 5, as the desired signal power (G×S).

As described above, in the case where the interference signal power (G×I1+I2) is larger than a certain reference value, as well as in the case where the desired signal power (G×S) is larger than a certain reference value, the SIR is not affected by the value of the gain G of the antenna 2. Therefore, from the total amount of the interference signal power (G×I1+I2) and the desired signal power (G×S), that is, from the electric power of entire received signals inputted to the BB signal processing circuit 4, it is possible to determine whether the SIR is affected by the value of the gain G of the antenna 2, or not. That is, by determining whether the electric power of entire received signals inputted to the BB signal processing circuit 4, i.e., (G×I1+I2+G×S), is larger than a certain reference value, or not, it is possible to determine whether the SIR is affected by the value of the gain G of the antenna 2.

Therefore, in a different embodiment, the reception intensity measurement unit 20 may be configured to measure the electric power of entire received signals (G×I1+I2+G×S) as the reception intensity P. Further, the switching signal generator 22 may be configured to output a switching signal having a value "OFF" in the case where the electric power (G×I1+I2+G×S) is larger than a certain reference value R.

A certain reference value R employed in an embodiment in which the desired signal power (G×S) is used as the reception intensity P, as well as a certain reference value R employed in an embodiment in which the electric power of entire received signals (G×I1+I2+G×S) is used as the reception intensity P, may be also determined in accordance with a noise figure NF and thermal noise X (=kBT) of the wireless communication apparatus 1. Further, a certain reference value R employed in an embodiment in which the desired signal power (G×S) is used as the reception intensity P, as well as a certain reference value R employed in an embodiment in which the power of entire received signals (G×I1+I2+G×S) is used as the reception intensity P, may be also determined in accordance with the measured value of the internal inference signal power I2 of the wireless communication apparatus 1.

Further, in the above-described embodiment, the reception intensity measurement unit 20 measures the value of electric power as the reception intensity P. Further, the switching signal generator 22 determines the value of the switching signal on the basis of the result of comparison of the value of electric power and a certain reference value R. The halting unit 51 halts controlling the impedance of the antenna 2 when the intensity of the received radio signal is greater than a predetermined value set in accordance with a noise figure NF and a thermal noise X of the communication unit 50.

As a substitute for this method, the reception intensity measurement unit 20 may measure the reception intensity P which is expressed in the form of one of various kinds of indexes enabling expression of the intensities of the interference signals, the intensity of the desired signal and the intensity of the entire received signals. The reception intensity measurement unit 20 may determine the value of the switching signal on the basis of the result of comparison between the value of the reception intensity P and a certain reference value R, which are expressed in the form of one of the various kinds of indexes. In the case where the reception index P is expressed in the form of one of the various kinds of indexes, the corresponding reference value R used therein may be also determined in accordance with a noise figure NF and thermal noise X (=kBT) of the wireless communication apparatus 1, or the measured value of the internal interference signal power I2 of the wireless communication apparatus 1.

With respect to aspects of the present invention including the foregoing embodiments, the following appendixes will be further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless communication apparatus comprising:
    an antenna;
    a communication circuit for receiving a radio signal via the antenna;
    a tuning circuit for tuning an impedance of the antenna;
    an impedance controlling circuit for controlling the tuning circuit to match the impedance of the antenna with an impedance of the communication circuit; and
    a halting circuit for halting the controlling for the impedance of the antenna in accordance with a reception intensity of an interference signal included in the received radio signal.

2. The wireless communication apparatus of claim 1, wherein the halting circuit restarts the controlling for the impedance of the antenna in accordance with the reception intensity of the interference signal included in the received radio signal after the halting circuit halts the controlling for the impedance of the antenna.

3. The wireless communication apparatus of claim 1, wherein the halting circuit halts the controlling for the impedance of the antenna when the reception intensity of the interference signal included in the received radio signal is greater than a predetermined value.

4. The wireless communication apparatus of claim 3, wherein the predetermined value is set in accordance with a noise figure and a thermal noise of the communication circuit.

5. A method of controlling a wireless communication apparatus, comprising:

receiving a radio signal by a communication circuit of the wireless communication apparatus via an antenna of the wireless communication apparatus;

tuning an impedance of the antenna to match with an impedance of the communication circuit; and halting controlling for the tuning of the impedance of the antenna in accordance with an intensity of an interference signal included in the received radio signal.

* * * * *